Jan. 23, 1934.  K. W. THALHAMMER  1,944,476
CAMERA ATTACHMENT
Filed Nov. 1, 1929
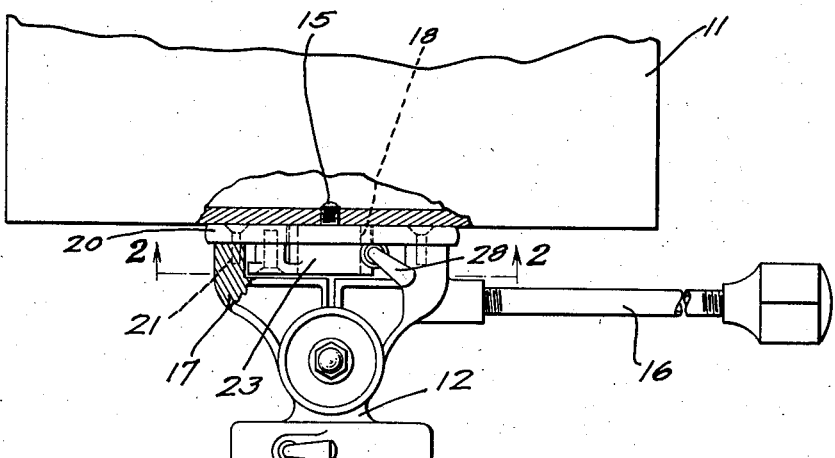
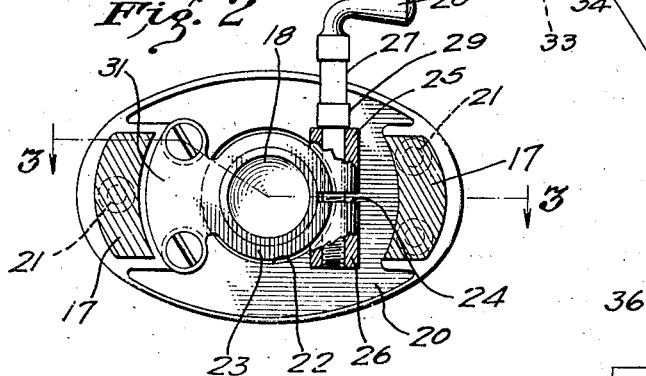
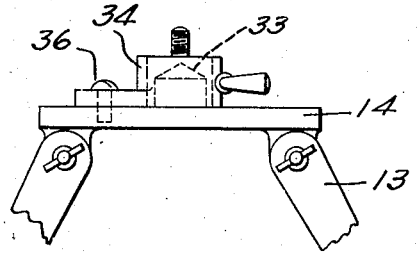
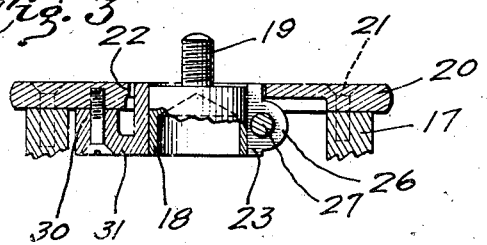
INVENTOR
Karl W. Thalhammer
BY
John Flam
ATTORNEY Patented Jan. 23, 1934

1,944,476

UNITED STATES PATENT OFFICE 1,944,476

CAMERA ATTACHMENT

Karl W. Thalhammer, Los Angeles, Calif.

Application November 1, 1929. Serial No. 404,046

2 Claims. (Cl. 248—47)

This invention relates to an attachment that is especially adapted to be used in connection with tripods and cameras.

Ordinarily, cameras or other instruments that are arranged to be supported on a tripod, are provided with screw sockets into which a clamping screw can extend. This screw usually extends either through the tripod head proper, or (if a tilting head is used), from the tilting head fastened to the tripod head. In the latter case, the tilting head is usually fastened to the tripod head in an entirely analogous manner; that is, by the aid of a screw that engages a screw socket in the bottom of the tilting head.

Difficulty is sometimes experienced to position such clamping screws properly with relation to the socket. This arises because the camera on the tilting head covers the support through which the clamping screw projects. It is one of the objects of my invention to overcome this difficulty.

I attain this object by providing a clamping device of different construction than used heretofore, and especially by the aid of a post that can be preliminarily screwed into the attaching socket, and which can then be clamped as by the aid of friction into the tripod head or the tilting head.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

Figure 1 is an elevation showing my attachment in use in connection with a tripod, a camera, and a tilting head;

Fig. 2 is a sectional view taken along plane 2—2 of Fig. 1;

Fig. 3 is a sectional view, taken along plane 3—3 of Fig. 2; and

Fig. 4 is an elevation showing how my device can be used in slightly different position on the tripod.

In Fig. 1, there is shown a camera 11, a tilting head 12, and a tripod 13 having a head or rest 14. The camera 11 is shown as being provided with a screw socket 15, in the usual manner. The tilting head 12 has a handle 16 for its ready manipulation. It is also provided with the U-shaped extension 17 upon which the attachment that embodies the invention can be secured.

This attachment includes a post 18 that has a screw projection 19 adapted to be engaged in socket 15. This post 18 is of larger diameter than the screw 19, and is preferably cylindrical. It can be screwed tightly in place in socket 15 without difficulty; and a clamp device fastened on top of extension 17 is arranged to hold this post in place.

This clamp device includes a plate 20 fastened as by screws 21 across the legs of the extension 17, thus defining a space between the legs of the extension 17 and below the plate 20. The plate 20 has a large central aperture 22 (Fig. 3) into which projects a split ring 23. This ring clears the aperture 22 as shown in Fig. 2, and accommodates the body of post 18. At each side of split 24 in this ring there is an ear 25, or 26. Ear 26 is threaded, and ear 25 is provided with an aperture for passing the body of a clamping screw 27. This screw has a handle 28 for ready manipulation. It also has a collar 29 engaging the outer end of ear or lug 25, whereby upon tightening the screw 27 in the ear 26, the ears 25, 26 will be urged together to contract the ring 23 around the body of post 18, thus holding it by friction.

The ring 23 is fastened to the lower surface of plate 20, as by the aid of lugs 30 on a projection 31 extending from one side of the ring 23, and opposite the split 24.

It is apparent that, in use, post 18 can be first fastened in place, to form a cylindrical projection below camera 11. Then it can be set into ring 23 to bring the camera 11 at any desired horizontal angle with respect to the vertical axis of the ring 23, after which the clamp screw 27 can be tightened.

The tilting head 12 is also shown as having a socket 32 for the accommodation of a clamping screw. The same clamping arrangement could be utilized as for the camera 11, in this case also. Thus plate or head 14 can be provided with a clearance aperture for a post 33 similar to post 18. This post 33 can be clamped in a clamping ring 34 similar to ring 23. This ring 34 in turn can be held to the bottom of plate 14 as by screws 35.

In some instances, the ring 34 can advantageously be supported on the top surface of the tripod plate 14. For example, in Fig. 4, I show plate 14 with the ring 34 and post 33, fastened to the top of the plate 14 as by screws 36. In this case, post 33 needs no clearance aperture in plate 14 as it projects above said plate. The top surface of ring 34 and of the cylindrical part of post 33 serve as a rest for either a tilting head such as 12, or a camera or other device.

I claim:

1. In a support for an instrument, a supporting plate upon which the instrument rests and having an aperture, a split ring positioned in the aperture, said ring having a boss for fastening it to the plate, a post arranged to be clamped by the ring, said post having a projection for fastening it in a socket, and means for contracting the ring.

2. A tilting head having, in combination, a stationary part, a movable part cooperating with said stationary part, said movable part comprising a body member, a plate member having an aperture formed therein, a split ring member positioned in said aperture, a support for said ring member, an instrument post in said ring member and extending beyond said plate member, and tightening means for rigidly clamping said split ring member on said instrument post.

KARL W. THALHAMMER.